US008968551B2

(12) United States Patent
Moran et al.

(10) Patent No.: US 8,968,551 B2
(45) Date of Patent: Mar. 3, 2015

(54) SYNERGISTIC ASPHALT CRUDE COMPOSITIONS

(71) Applicant: ExxonMobil Research and Engineering Company, Annandale, NJ (US)

(72) Inventors: Lyle Edwin Moran, Sarnia (CA); Mary Josephine Gale, Lambton Shore (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 246 days.

(21) Appl. No.: 13/723,463

(22) Filed: Dec. 21, 2012

(65) Prior Publication Data
US 2014/0174981 A1   Jun. 26, 2014

(51) Int. Cl.
C10G 7/00 (2006.01)
C08L 95/00 (2006.01)
C10C 3/00 (2006.01)
C10C 3/06 (2006.01)
C10G 21/00 (2006.01)

(52) U.S. Cl.
CPC . *C10C 3/06* (2013.01); *C10C 3/005* (2013.01); *C10G 21/003* (2013.01); *C08L 95/00* (2013.01); *C08L 2555/10* (2013.01)
USPC .............................................. 208/39; 208/41

(58) Field of Classification Search
CPC ..... C08L 2555/10; C08L 95/00; C10C 3/005; C10C 3/06; C10G 21/003
USPC ...................................................... 208/39, 41
See application file for complete search history.

(56) References Cited

U.S. PATENT DOCUMENTS

2002/0151083 A1   10/2002   Roussis et al.
2006/0011101 A1   1/2006   Gale et al.
2008/0006561 A1   1/2008   Moran et al.

OTHER PUBLICATIONS

The International Search Report and Written Opinion of PCT/US2013/071255 dated Mar. 19, 2014.

*Primary Examiner* — Walter D Griffin
*Assistant Examiner* — Derek Mueller
(74) *Attorney, Agent, or Firm* — Robert A. Migliorini; Larry E. Carter

(57) ABSTRACT

Methods are provided for forming an asphalt fraction corresponding to a blend of asphalts, the asphalt fraction having at least one property that is unexpectedly better than the expected property value based on the individual asphalts used in the blend. The unexpectedly beneficial blends of asphalts are formed in part by including an effective amount of a Napo crude oil or crude fraction in the feed used to form the asphalt fraction. For some asphalt blends, including an effective amount of a Napo crude in the feed can allow for production of an asphalt with a low temperature performance grade that is lower than the predicted value by at least 0.5° C., such as at least 0.75° C. or at least 1.0° C.

19 Claims, 4 Drawing Sheets

| | A | B | C | D | E | F | G | H | I | J | K |
|---|---|---|---|---|---|---|---|---|---|---|---|
| | | Low PG Temperature | Arab Heavy | Estimated AxH | Arab Medium | Estimated AM | Troll | Estimated Troll | Duc | Estimated DUC | Estimated Ekofisk (= Duc) |
| 1 | Arab Heavy | -29.8 | 61.3 | | | | | | | | |
| 2 | Arab Heavy | -37.7 | 61.2 | | | | | | | | |
| 3 | Estimated AxH | -32 | | 58.5 | | | | | | | |
| 4 | Arab Medium | -32.4 | | | 53.8 | | | | | | |
| 5 | Arab Medium | -34 | | | 51.3 | | | | | | |
| 6 | Arab Medium 2006 | -35.1 | | | 49.4 | | | | | | |
| 7 | Arab Medium 2006 | -29.2 | | | 58.1 | | | | | | |
| 8 | Arab Medium 2006 | -25 | | | 64.2 | | | | | | |
| 9 | Estimated AM | -29 | | | | 58.5 | | | | | |
| 10 | Troll 541°C+, 14.1 LV% | -30.2 | | | | | 35.3 | | | | |
| 11 | Estimated Troll | -29 | | | | | | 58.5 | | | |
| 12 | DUC 568°C+, 12.8 LV% | -33.5 | | | | | | | 41.1 | | |
| 13 | Estimated DUC | -21 | | | | | | | | 58.5 | |
| 14 | Estimated Ekofisk (= Duc) | -21 | | | | | | | | | 58.5 |

SYNERGISTIC ASPHALT CRUDE COMPOSITIONS

FIELD

This disclosure describes asphalt blends with unexpectedly improved properties relative to the feedstocks used for forming the asphalt blends.

BACKGROUND

Asphalt is one of the world's oldest engineering materials, having been used since the beginning of civilization. Asphalt is a strong, versatile and chemical-resistant binding material that adapts itself to a variety of uses. For example, asphalt is used to bind crushed stone and gravel into firm tough surfaces for roads, streets, and airport runways. Asphalt, also known as pitch, can be obtained from either natural deposits, or as a by-product of the petroleum industry. Natural asphalts were extensively used until the early 1900s. The discovery of refining asphalt from crude petroleum and the increasing popularity of the automobile served to greatly expand the asphalt industry. Modern petroleum asphalt has the same durable qualities as naturally occurring asphalt, with the added advantage of being refined to a uniform condition substantially free of organic and mineral impurities.

Most of the petroleum asphalt produced today is used for road surfacing. Asphalt is also used for expansion joints and patches on concrete roads, as well as for airport runways, tennis courts, playgrounds, and floors in buildings. Another major use of asphalt is in asphalt shingles and roll-roofing which is typically comprised of felt saturated with asphalt. The asphalt helps to preserve and waterproof the roofing material. Other applications for asphalt include waterproofing tunnels, bridges, dams and reservoirs, rust-proofing and sound-proofing metal pipes and automotive under-bodies; and sound-proofing walls and ceilings.

The raw material used in modern asphalt manufacturing is petroleum, which is naturally occurring liquid bitumen. Asphalt is a natural constituent of petroleum, and there are crude oils that are almost entirely asphalt. The crude petroleum is separated into its various fractions through a distillation process. After separation, these fractions are further refined into other products such as asphalt, paraffin, gasoline, naphtha, lubricating oil, kerosene and diesel oil. Since asphalt is the base or heavy constituent of crude petroleum, it does not evaporate or boil off during the distillation process. Asphalt is essentially the heavy residue of the oil refining process.

SUMMARY

In an embodiment, a method is provided for forming an asphalt fraction. The method includes selecting a high temperature performance grade for an asphalt fraction; receiving a blend of a plurality of crude fractions, the blend of the plurality of crude fractions comprising 20 wt % to 70 wt % of a Napo crude fraction, the blend of crude fractions having a predicted tow temperature performance grade using a linear average prediction model at the selected high temperature performance grade that is at least 2.5° C. greater than a low temperature performance grade for the Napo crude oil at the selected high temperature performance grade; and separating the blend of crude fractions to form an asphalt fraction having a high temperature performance grade that differs from the selected high temperature performance grade by 0.1° C. or less, the low temperature performance grade of the blended asphalt being lower than the predicted low temperature performance grade by at least 0.5° C.

In another embodiment, a method for forming an asphalt fraction is provided. The method includes mixing a plurality of crude oils to form a blend of the plurality of crude fractions, the blend of the plurality of crude fractions comprising 20 wt % to 70 wt % of a Napo crude, each crude fraction in the plurality of crude fractions having at least one measured performance grade for an asphalt formed from the crude fraction, and one or more crude fractions in the plurality of crude fractions having a plurality of measured performance grades based on asphalts formed from the one or more crude fractions, a performance grade corresponding to a high temperature performance grade and a low temperature performance grade; predicting a performance grade for the blend of the plurality of crude fractions using a linear average prediction model to calculate a low temperature performance grade that corresponds to a selected high temperature performance grade, the low temperature performance grade of the predicted performance grade being at least 2.5° C. greater than a low temperature performance grade for the Napo crude fraction at the selected high temperature performance grade; and separating the blend of crude fractions to form an asphalt fraction having a high temperature performance grade that differs from the selected high temperature performance grade by 0.1° C. or less, the low temperature performance grade of the blended asphalt being lower than the predicted low temperature performance grade by at least 0.5° C.

BRIEF DESCRIPTION OF THE DRAWINGS

FIG. 1 shows a data set for use in predicting a low temperature performance grade for an asphalt formed from a blend of crude oils.

FIG. 3 shows a data set for use in predicting a low temperature performance grade for an asphalt formed from a blend of crude oils.

DETAILED DESCRIPTION

Figure 2:
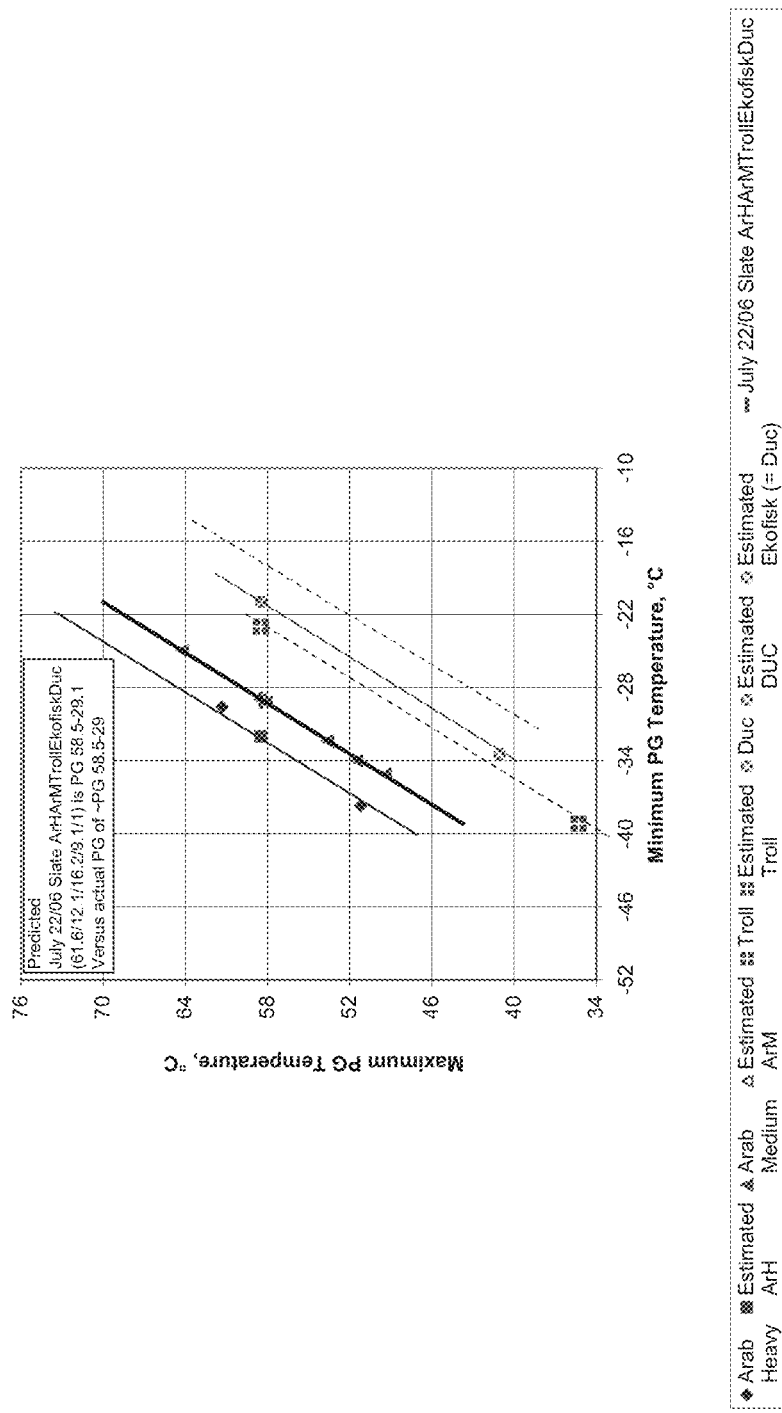
FIG. 2 shows a performance grade matrix for use in predicting a low temperature performance grade for an asphalt formed from a blend of crude oils.

All numerical values within the detailed description and the claims herein are modified by "about" or "approximately" the indicated value, and take into account experimental error and variations that would be expected by a person having ordinary skill in the art.

In the discussion herein, reference will be made to crude fractions that are used for forming blends of crude fractions that can be distilled or separated to form an asphalt fraction. A crude fraction is defined herein to include any type of feed that can be incorporated into a petroleum stream for use in forming an asphalt fraction. Thus, a crude fraction is defined herein to include (but not necessarily limited to) heavy oils, whole petroleum crude oils, reduced petroleum crude oils, atmospheric residua feedstocks, and vacuum residua feedstocks. A crude fraction can optionally correspond to either an asphaltic crude fraction or a diluent crude fraction.

Overview

In various aspects, methods are provided for forming an asphalt fraction corresponding to a blend of asphalts, the asphalt fraction having at least one property that is unexpectedly better than the expected property value based on the individual asphalts used in the blend. The unexpectedly beneficial blends of asphalts are formed in part by including an effective amount of a Napo (Ecuador) crude oil or crude fraction in the feed used to form the asphalt fraction. For asphalt blends that are predicted to have a low temperature performance grade of −30° C. or higher, including an effective amount of a Napo crude in the feed can allow for production of an asphalt with a low temperature performance grade that is lower than the predicted value by at least 0.5° C., such as at least 0.75° C. or at least 1.0° C.

The properties of asphalt blends are difficult to predict. An asphalt blend can include material from both asphaltic crudes and diluents crudes. Asphaltic crudes have enough asphaltenes and maltenes to contribute to the properties of an asphalt resid used for paving and roofing applications. A diluent crude has lower resid yield and typically is distilled overhead. Some diluents crudes can have a negative impact on asphalt product properties due, for example, to high wax content and/or aromatic molecules with poor stiffness performance at high or low temperatures. The diluent crude is added to minimize the overall pitch yield during asphalt manufacture which typically is a restricting factor especially with respect to fuels refineries. Lighter crudes also help to balance light product production (i.e. gasoline and diesel) to meet market demands. Models based on weighted linear averages for properties (based on blend ratios) can be used, but it is understood that some amount of difference between the predicted value and the measured value is likely. Thus, a difference of a few tenths of a degree between the predicted low temperature performance grade and the actual low temperature performance grade may be expected. Although some error is expected, differences between a predicted low temperature performance grade and a measured value of more than 0.5° C. are surprising.

This disclosure is based on the discovery that there is an unexpected and surprising synergistic effect on the quality of an asphalt fraction when Napo crude from Ecuador is blended with various asphaltic and diluent crudes. Relative to a prediction based on a linear weighted average of blend components, blends containing an effective amount of a Napo crude with other asphaltic and diluent crudes result in asphalt fractions with better than expected properties for low temperature performance grade. It is hypothesized that the underlying cause of the Napo synergy in asphalt crude recipes may be related to the beneficial effect of, for example, undiscovered chemical structures in the Napo crude with asphaltene dispersing properties that allow the asphaltenes to impart maximum asphalt engineering properties. The Napo synergy leads to asphalt crude compositions using lower amounts of Napo crude than would normally be expected, and/or greater amounts of lower quality asphaltic and diluent crudes to make specification grade asphalt.

The Napo asphalt crude synergy can allow for asphalt manufacture at lower asphaltic crude proportions with higher diluent content, and/or with poorer quality asphaltic crudes. This leads to significant raw material savings with respect to the cost of asphalt manufacture due to being able to use a greater amount of lower cost asphaltic and diluent crude components.

Feedstocks

Some feedstocks in accordance with the present disclosure are heavy oils that include at least a portion of asphaltenes. Such heavy oils are suitable, possibly after additional distillation, for making an asphalt. Asphalt is a viscoelastic semisolid bituminous material derived from the distillation residue of crude petroleum. Asphalt may be obtained from a variety of heavy oil sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Because it is hydrophobic and has good adhesive and weathering characteristics, asphalt is widely used as a binder or cement for stone or rock aggregate in pavement construction (typically only 5 wt % of the mixture). Other feedstocks suitable for use in the disclosure include whole or reduced petroleum crude oils, atmospheric residua feedstocks, and vacuum residua feedstocks.

One option for defining a boiling range is to use an initial boiling point fir a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil. Similarly, a "F95" boiling is defined as the temperature at which 95 wt % of the feed will boil.

A typical feedstock for forming asphalt can have a normal atmospheric boiling point of at least 350° C., more typically at least 400° C., and will have a penetration range from 20 to 500 dmm at 25° C. (ASTM D-5). Alternatively, a feed may be characterized using a T5 boiling point, such as a feed with a T5 boiling point of at least 350° C., or at least 400° C., or at least 440° C.

Another example of a feedstock suitable for forming asphalt is a feedstock derived from an atmospheric resid fraction or a similar petroleum fraction. For example, when a whole crude oil, partial crude oil, or other feedstock is processed in a refinery, one common type of processing is to distill or fractionate the crude oil based on boiling point. One type of fractionation is atmospheric distillation, which can result in one or more fractions that boil at less than 650° F. (343° C.) or less than 700° F. (371° C.), and a bottoms fraction. This bottoms fraction corresponds to an atmospheric resid.

The bottoms fraction from atmospheric distillation can then be separated or fractionated using vacuum distillation. This generates one or more (vacuum) gas oil fractions and a vacuum resid fraction. Because the vacuum distillation is typically performed on a resid from atmospheric distillation, a vacuum gas oil fraction can be defined as a fraction with a T10 boiling point of at least 650° F. (343° C.), such as at least 700° F. (371° C.). Preferably, a vacuum gas oil fraction can have a T5 boiling point of at least 650° F., such as at least 700° F. The vacuum resid fraction may be suitable for use as an asphalt. The distillation cut point for forming the vacuum bottoms fraction can be selected based on a desired amount of vacuum gas oil and/or a desired quality for the asphalt fraction. Selecting a higher temperature cut point can increase the amount of a vacuum as oil. However, such a higher temperature cut point will typically reduce the quality of the corresponding asphalt. Since both vacuum gas oil yield and asphalt quality are also dependent on the nature of the feedstock, the temperature cut point to achieve a desired combination of vacuum gas oil yield and asphalt quality will vary. A suitable cut point for the vacuum bottoms fraction to achieve a desired asphalt quality and/or to achieve a desired vacuum gas oil yield can be at least 750° F. (399° C.), such as at least 950° F. (510° C.) or at least 1050° F. (566° C.). Additionally or alternately, asphalts derived based on a cut point of at least 1100° F. (593° C.) or at least 1150° F. (621° C.) may also be suitable. This can allow for a further increase in the amount of vacuum gas oil derived from a given feedstock.

The feeds used for formation of asphalt can also correspond to blends of feeds, such as blends of feeds from different crude sources. For example, a Napo crude feed represents one of several types of crude oils from Ecuador. Blends of crude feeds can be used for asphalt formation for any convenient reason, such as in order to allow crude oils with less favorable properties to be incorporated into a higher value product.

Asphalt Properties and SUPERPAVE Criteria

One way of characterizing an asphalt composition is by using SUPERPAVE™ criteria. SUPERPAVE™ criteria (as described in the June 1996 edition of the AASHTO Provisional Standards Book and 2003 revised version) can be used to define the Maximum and Minimum Pavement service temperature conditions under which the binder must perform. SUPERPAVE™ is a trademark of the Strategic Highway Research Program (SHRP) and is the term used for new binder specifications as per AASFITO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders were measured by Bending Beam Rheometer (BBR). According to SUPERPAVE™ criteria, the temperature at which a maximum creep stiffness (S) of 300 MPa at 60s loading time is reached, is the Limiting Stiffness Temperature (LST). Minimum Pavement Temperature at which the binder will resist cracking (also called Cracking Temperature) is equal to LST-10° C.

The SUPERPAVE™ binder specifications for asphalt paving binder performance establishes the high temperature and low temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. in both HT and LT. This was established because the stiffness of asphalt doubles every 6° C. One can plot the performance of asphalt on a SUPERPAVE™ matrix grid. The vertical axis represents increasing high PG temperature stiffness and the horizontal axis represents decreasing low temperature stiffness towards the left. In some embodiments, a heavy oil fraction used for producing the deasphalted residue and/or the heavy oil fraction used for forming a mixture with the deasphalted residue can have a performance grade at high temperature of 58° C. or less, or 52° C. or less, or 46° C. or less.

Figure 4:
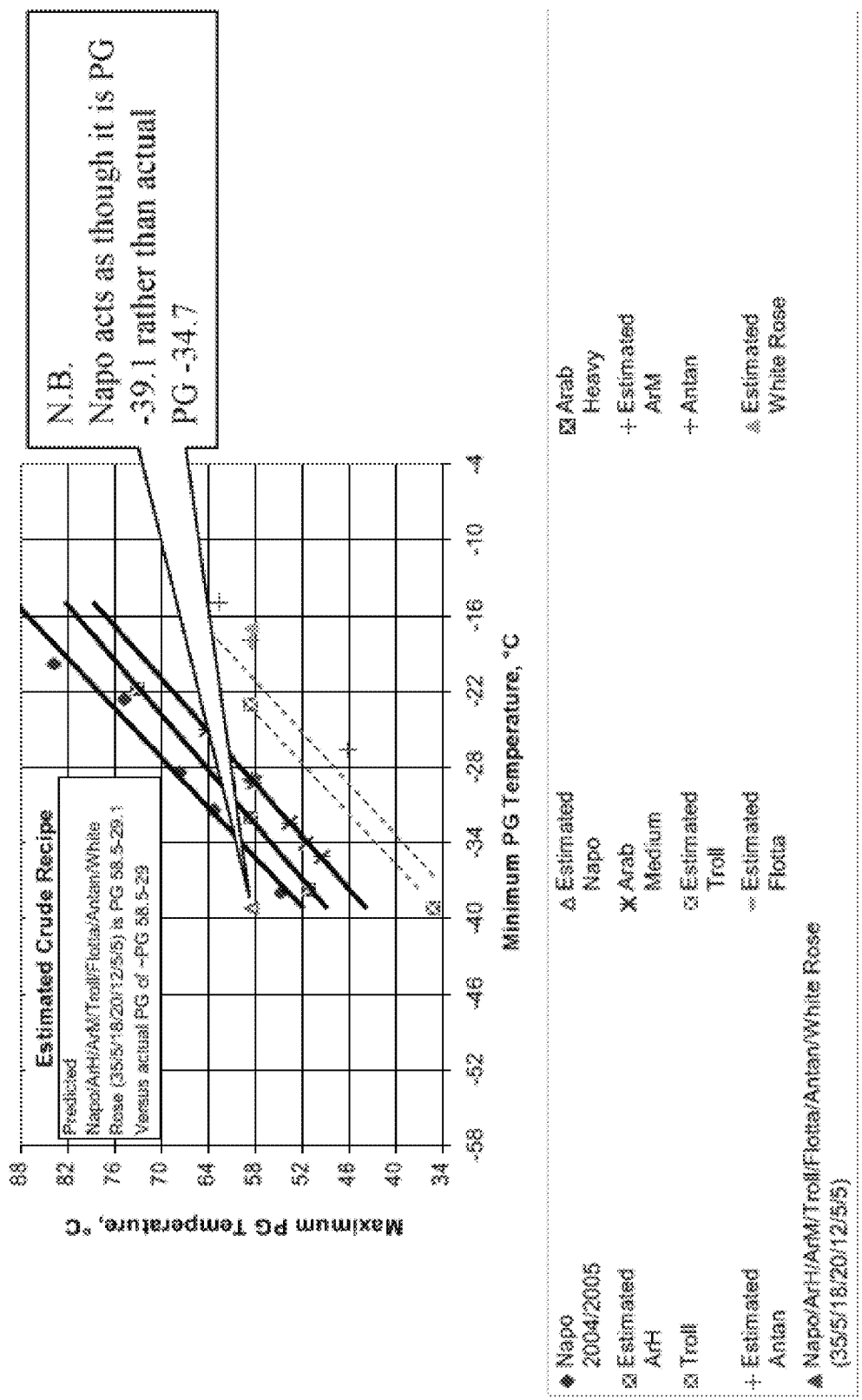
FIG. 4 shows a performance grade matrix for use in predicting a low temperature performance grade for an asphalt formed from a blend of crude oils.

The data in FIGS. 2 and 4 are plotted on a SUPERPAVE™ PG matrix grids. These curves (lines) shown in FIGS. 2 and 4 pass through various PG specification boxes. Asphalt binders from a particular crude pass the SUPERPAVE™ specification criteria if they fall within the PG box through which the curves pass. Directionally poorer asphalt performance is to the lower right. Target exceptional asphalt or enhanced, modified asphalt performance is to the upper left, most preferably in both the HT and LT performance directions.

Although asphalt falls within a PG box that allows it to be considered as meeting a given PG grade, the asphalt may not be robust enough in terms of statistical quality control to guarantee the PG quality due to variation in the PG tests. This type of property variation is recognized by the asphalt industry as being as high at approximately +/-3° C. Thus, if an asphalt producer wants to consistently manufacture a given grade of asphalt, such PG 64-28, the asphalt producer can preferably ensure that the PG tests well within the box and not in the right lower corner of the box. Any treatment which moves the curve out of the lower right corner, even if only in the HT direction, is deemed to result in the production of a higher quality asphalt, even if nominally in the same grade.

Prediction of Properties of Asphalts Formed from Blended Crude Feeds

In various embodiments, use of an effective amount of a Napo crude in an blend of crude fractions for forming an asphalt fraction can result in the production of an asphalt fraction with an improved low temperature performance grade relative to the low temperature performance grade that would be predicted using conventional methods. In order to predict the low temperature performance grade of an asphalt fraction derived from a blend of asphaltic and/or diluent crudes, the following procedure can be used. This procedure is based on using and/or extrapolating the high temperature performance grade (HTPG) and low temperature performance grade (LTPG) for the crude fractions in a blend so that a curve or line for each crude fraction is available. Preferably, at least one crude fraction in a blend of crude fractions has been used to form multiple asphalts with different measured performance grades.

First, an assumption can be made that, in general, performance grade (PG) curves/lines for the various crude fractions are essentially parallel. This is believed to be a reasonable assumption for a variety of known crudes containing material with a sufficiently high boiling point to be included in an asphalt. A suitable slope for the parallel lines in the matrix can be determined in several ways. If one or more crude fractions in a blend have a larger number of available asphalt data points, the parallel lines for the one or more crudes can be determined using a fitting procedure, such as least squares. The slope of this line fit can then be used for the other crude fractions in a blend that may only have one measured asphalt data point. Alternatively, a fit can be made to the data for all crude fractions in a blend where multiple data points are available. Based on the assumption that all lines in the performance grade matrix are essentially parallel, lines can then be drawn for crudes where only one data point is available. For example, some diluent crudes may generate asphalts of low quality or value, so that only minimal characterization has been performed. This could result in a situation where a crude oil has only been characterized for asphalt formation at one data point. This single data point plus the slope determined from the fit are then sufficient to draw a line for the crude oil on the performance grade matrix.

Next, an anchor point temperature is set for the HTPG temperature. The HTPG temperature can be a selected for any convenient reason, such as selecting a temperature that corresponds to a desired performance grade for an asphalt product. For example, for all crudes in a crude blend, the high temperature performance grade temperature can be set at 58.5° C. Other high temperature performance grade values can be used as the anchor point temperature, depending on refinery operational experience. Based on this anchor point, the lines in the performance grade matrix corresponding to each crude fraction can be used to find the value for the low temperature performance grade that intersects the crude's performance grade line at the selected high temperature performance grade. This intersection data point can be referred to as the estimated target.

By generating an intersection data point (or estimated target) for each crude in a blend, a weighted average of the low temperature performance grades can be determined for asphalts resulting from each crude. The average can be weighted based on the wt % of a crude in the blends of crudes. This weighted average value corresponds to the predicted low temperature performance grade for an asphalt formed from a blend of crudes. The combination of the selected high temperature performance grade and the calculated low temperature performance grade represents a predicted performance grade for one asphalt that can be generated from the blend of crude fractions. Preferably, the selected high temperature performance grade for a predicted performance grade can be within 0.1° C. of the measured high temperature performance grade for a corresponding asphalt fraction formed from the blend of the plurality of crude fractions.

FIG. 1 shows an example of a data set for a slate of crude oils and/or crude fractions for inclusion in a feed for forming a blended asphalt. In FIG. 1, the data set includes crudes from sources with various designations, including an Arab Heavy crude, and Arab Medium crude, a Troll crude, an Ekofisk crude, and a Duc crude. The data set shows both measured combinations of HTPG and LTPG for the crudes, as well as the estimated LTPG for the crude at an HTPG value of 58.5. The data in FIG. 1 can be derived by developing lines or curves on a performance grade matrix as described above. An example of such as the matrix based on the data in Table 1 is shown in FIG. 2.

Based on the estimated LTPG values determined from FIG. 2 (and shown in FIG. 1), the low temperature performance grade for an asphalt derived from a blend of the crudes in FIG. 1 can be determined. In the example shown in FIGS. 1 and 2, the blend of crudes for forming the asphalt corresponds to 61.6 wt % of Arab Heavy; 12.1 wt % of Arab Medium; 16.2 wt % of Troll; 9.1 wt % of Ekofisk; and 1.0 wt % of Duc. Using the percentages of the individual crudes in the feed, a weighted average can be determined, such as by using the formula shown in FIG. 1. The predicted value for low temperature performance grade for the asphalt derived from this crude is −29.1° C. This predicted value differs by 0.3° C. from the measured value from production of the corresponding asphalt of −29.4° C.

Unexpected Benefit of Napo Crude for Asphalt Formation

FIGS. 1 and 2 show that a linear blending model is generally suitable for prediction of the low temperature performance grade of asphalts formed from a blend of crudes. However, blends of crude oils and/or crude fractions that include an effective amount of a Napo crude can result in asphalts with low temperature performance grades that are noticeably different from a predicted value.

Figure 3:
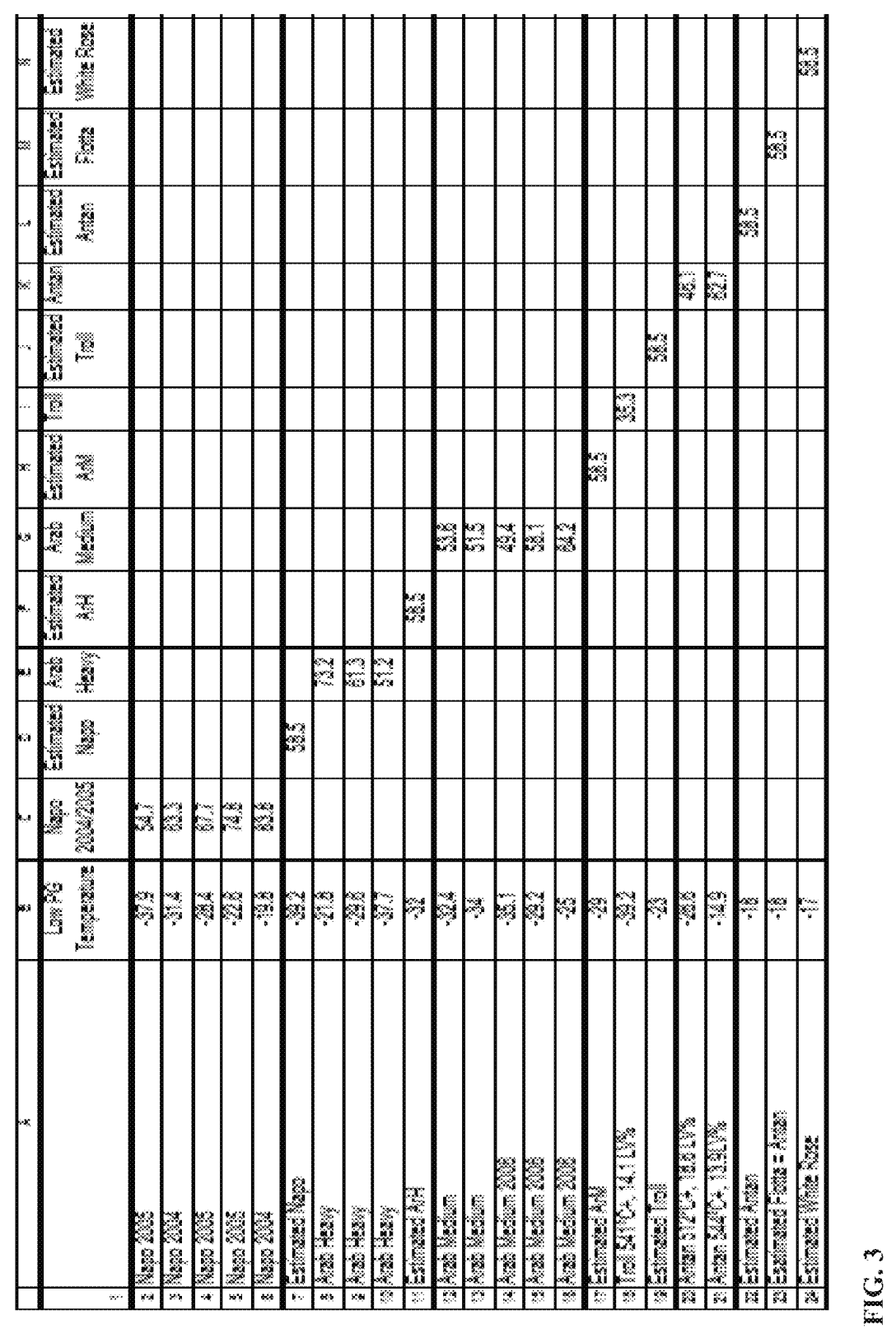

FIG. 4 shows a performance matrix used for prediction of asphalt properties derived from a blend of a Napo crude fraction with several other crude fractions. FIG. 3 shows the corresponding data table for FIG. 4. In this example, the desired blend of crude fractions for forming an asphalt corresponds to 35 wt % of a Napo (Ecuador) crude; 5 wt % of an Arab Heavy crude; 18 wt % of an Arab Medium crude; 20 wt % of a Troll crude; 12 wt % of a Flotta crude; 5 wt % of an Antan crude; and 5 wt % of a White Rose crude. It is noted that other than the Napo crude, the remaining crudes in the slate shown in FIG. 4 typically show linear behavior for a low temperature performance grade prediction according to the methods described herein.

Based on the lines in FIG. 3, the low temperature performance grade of the Napo crude fraction appears to be −34.7° C. (at a high temperature PG of 58.5° C.). This would result in a prediction of a PG for the resulting asphalt of 58.5-27.5. However, the actual measured performance grade of the resulting asphalt is 58.5-29.1. Thus, the measured performance grade differs from the linear prediction model by −1.6° C. In order to predict the resulting asphalt when a Napo crude is included in the blend of crude fractions, the prediction model has to be modified to assign the Napo crude a performance grade of 58.5-39.2. This is a −4.5° C. difference in the low temperature performance grade between the line in FIG. 3 for the Napo crude fraction and the actual impact on the resulting asphalt. This difference represents the unexpected synergy resulting from use of an effective amount of a Napo crude in a blend of crude fractions for forming an asphalt.

In order to derive the synergistic benefit of including a Napo crude fraction into a blend of crude fractions for forming an asphalt, an effective amount of the Napo crude can be used. First, the effective amount corresponds to a large enough wt % of Napo crude to provide meaningful synergistic effect. As shown in FIGS. 1 and 2, the linear prediction method can generally have an error (relative to a measured value) of 0.5° C. or less. Introduction of a low amount of a Napo crude into a crude fraction blend may or may not have an impact, but such impact would be difficult to distinguish from a routine error. Thus, the amount of Napo crude introduced into a blend of crude fractions for forming an asphalt can be sufficient to generate a difference between a predicted low temperature property grade and a corresponding measured value of at least −0.5° C., such as at least 0.75° C., and preferably at least −1.0° C. In order to achieve this level of impact, the amount of Napo crude in a blend of crudes can be at least 20 wt %, such as at least 25 w %, or at least 35 wt %.

Another consideration is having a sufficient amount of other crude fractions in the crude blend so that a synergistic benefit is achieved. As noted previously, based on measured values for asphalts derived from a Napo crude fraction, an asphalt formed from only a Napo crude at an appropriate distillation point would have a performance grade of 58.5-34.7. In order to achieve a synergistic benefit, the amount of other crude fractions present can be sufficient so that the resulting asphalt is sufficiently different from an asphalt formed from only a Napo crude. Thus, the amount of a Napo crude fraction in a blend of crude fractions can be 70 wt % or less, such as 60 wt % or less, or 50 wt % or less.

Still another consideration is that the blend of crude fractions that includes the Napo crude should be predicted to form an asphalt fraction with a low temperature performance grade that is higher than the performance grade for an asphalt formed from only a Napo crude. The benefit of using a Napo crude is believed to be based on a synergistic benefit from blending with other crude sources. However, the benefit of including a Napo crude in a blend is believed to be limited to blends of crudes that are predicted to have low temperature performance grades that are at least 2.0° C. higher than a corresponding asphalt formed from just a Napo crude. In other words, if an initial blend of crude fractions is predicted to result in an asphalt fraction with a PG of 58.5-34.7, addition of a Napo crude fraction to the blend (PG 58.5-34.7) would not be expected to improve the PG of the blend. Instead, the predicted low temperature performance grade of the blend of crudes, including the Napo crude, can be 32.0° C. or higher based on the linear prediction model, such as 30.0° C. or higher, and preferably 29.0° C. or higher. It is noted that the value of including a Napo crude fraction within a blend of crude fractions is based in part on the flexibility a Napo crude provides for allowing a larger amount of crudes with poor resulting asphalt properties to be included in a blend of crudes for forming asphalt.

ADDITIONAL EMBODIMENTS

Embodiment 1

A method for forming an asphalt fraction, comprising: selecting a high temperature performance grade for an asphalt fraction; receiving a blend of a plurality of crude fractions, the blend of the plurality of crude fractions comprising 20 wt % to 70 wt % of a Napo crude fraction, the blend of crude fractions having a predicted low temperature performance grade using a linear average prediction model at the selected high temperature performance grade that is at least 2.5° C. greater than a low temperature performance grade for the Napo crude oil at the selected high temperature performance grade; and separating the blend of crude fractions to form an asphalt fraction having a high temperature performance grade that differs from the selected high temperature performance grade by 0.1° C. or less, the low temperature performance grade of the blended asphalt being lower than the predicted low temperature performance grade by at least 0.5° C.

Embodiment 2

The method of Embodiment 1, wherein receiving a blend of a plurality of crude fractions comprises mixing a plurality of crude oils to form a blend of the plurality of crude fractions.

Embodiment 3

The method of any of the above embodiments, further comprising predicting a performance grade for the blend of the plurality of crude fractions using a linear average prediction model to calculate a low temperature performance grade that corresponds to a selected high temperature performance grade.

Embodiment 4

The method of any of the above embodiments, wherein the blend of the plurality of crude fractions comprises at least 30 wt % of the Napo crude oil.

Embodiment 5

The method of any of the above embodiments, wherein the blend of the plurality of crude fractions comprises 60 wt % or less of the Napo crude fraction.

Embodiment 6

The method of any of the above embodiments, wherein the selected high temperature performance grade is 52.0° C. to 65.0° C.

Embodiment 7

The method of any of the above embodiments, wherein the plurality of crude oils includes at least 5 different crude oils.

Embodiment 8

The method of any of the above embodiments, wherein the tow temperature performance grade of the asphalt fraction is lower than the predicted or calculated low temperature performance grade by at least 0.75° C.

Embodiment 9

The method of any of the above embodiments, wherein the low temperature performance grade of the asphalt fraction is lower than the predicted or calculated low temperature performance grade by at least 1.0° C.

Embodiment 10

The method of any of the above embodiments, wherein the blend of crude fractions have a predicted low temperature performance grade using a linear average prediction model at the selected high temperature performance grade that is at least 4.0° C. greater than a low temperature performance grade for the Napo crude oil at the selected high temperature performance grade.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for forming an asphalt fraction, comprising:
selecting a high temperature performance grade for all asphalt fraction;
receiving a blend of a plurality of crude fractions, the blend of the plurality of crude fractions comprising 20 wt % to 70 wt % of a Napo crude fraction, the blend of crude fractions having a predicted low temperature performance grade using a linear average prediction model at the selected high temperature performance grade that is at least 2.5° C. greater than a low temperature performance grade for the Napo crude oil at the selected high temperature performance grade; and
separating the blend of crude fractions to form an asphalt fraction having a high temperature performance grade that differs from the selected high temperature performance grade by 0.1° C. or less, the low temperature performance grade of the blended asphalt being lower than the predicted low temperature performance grade by at least 0.5° C.

2. The method of claim 1, wherein receiving a blend of a plurality of crude fractions comprises mixing a plurality of crude oils to form a blend of the plurality of crude fractions.

3. The method of claim 2, further comprising predicting a performance grade for the blend of the plurality of crude fractions using a linear average prediction model to calculate a low temperature performance grade that corresponds to a selected high temperature performance grade.

4. The method of claim 1, wherein the blend of the plurality of crude fractions comprises at least 30 wt % of the Napo crude oil.

5. The method of claim 1, wherein the blend of the plurality of crude fractions comprises 60 wt % or less of the Napo crude fraction.

6. The method of claim 1, wherein the selected high temperature performance grade is 52.0° C. to 65.0° C.

7. The method of claim 1, wherein the plurality of crude oils includes at least 5 different crude oils.

8. The method of claim 1, wherein the low temperature performance grade of the asphalt fraction is lower than the predicted or calculated low temperature performance grade by at least 0.75° C.

9. The method of claim 1, wherein the low temperature performance grade of the asphalt fraction is lower than the predicted or calculated low temperature performance grade by at least 1.0° C.

10. The method of claim 1, wherein the blend of crude fractions have a predicted low temperature performance grade using a linear average prediction model at the selected high temperature performance grade that is at least 4.0° C. greater than a low temperature performance grade for the Napo crude oil at the selected high temperature performance grade.

11. A method for forming an asphalt fraction, comprising:
mixing a plurality of crude oils to form a blend of the plurality of crude fractions, the blend of the plurality of crude fractions comprising 20 wt % to 70 wt % of a Napo crude, each crude fraction in the plurality of crude fractions having at least one measured performance grade for an asphalt formed from the crude fraction, and one or more crude fractions in the plurality of crude fractions having a plurality of measured performance grades based on asphalts formed from the one or more crude fractions, a performance grade corresponding to a high temperature performance grade and a low temperature performance grade;
predicting a performance grade for the blend of the plurality of crude fractions using a linear average prediction model to calculate a low temperature performance grade that corresponds to a selected high temperature performance grade, the low temperature performance grade of the predicted performance grade being at least 2.5° C. greater than a low temperature performance grade for the Napo crude fraction at the selected high temperature performance grade; and
separating the blend of crude fractions to form an asphalt fraction having a high temperature performance grade that differs from the selected high temperature performance grade by 0.1° C. or less, the low temperature performance grade of the blended asphalt being lower than the predicted low temperature performance grade by at least 0.5° C.

12. The method of claim 11, wherein the blend of the plurality of crude fractions comprises at least 30 wt % of the Napo crude oil.

13. The method of claim 11, wherein the blend of the plurality of crude fractions comprises 60 wt % or less of the Napo crude fraction.

14. The method of claim 11, wherein the blend of the plurality of crude fractions comprises 50 wt % or less of the Napo crude fraction.

15. The method of claim 11, wherein the selected high temperature performance grade is 52.0° C. to 65.0° C.

16. The method of claim 11, wherein the plurality of crude oils includes at least 5 different crude oils.

17. The method of claim 11, wherein the low temperature performance grade of the asphalt fraction is lower than the predicted or calculated low temperature performance grade by at least 0.75° C.

18. The method of claim 11, wherein the low temperature performance grade of the asphalt fraction is lower than the predicted or calculated low temperature performance grade by at least 1.0° C.

19. The method of claim 11, wherein the blend of crude fractions have a predicted low temperature performance grade using a linear average prediction model at the selected high temperature performance grade that is at least 4.0° C. greater than a low temperature performance grade for the Napo crude oil at the selected high temperature performance grade.

* * * * *